United States Patent [19]

Bauer et al.

[11] Patent Number: 4,881,977
[45] Date of Patent: Nov. 21, 1989

[54] WATER-SOLUBLE YELLOW MONOAZO DYESTUFFS

[75] Inventors: Wolfgang Bauer, Maintal; Willi Steckelberg; Josef Ritter, both of Hofheim, all of Fed. Rep. of Germany

[73] Assignee: Cassella Aktiengesellschaft, Frankfurt am Main, Fed. Rep. of Germany

[21] Appl. No.: 245,897

[22] Filed: Sep. 19, 1988

[30] Foreign Application Priority Data

Oct. 16, 1987 [DE] Fed. Rep. of Germany ....... 3735078

[51] Int. Cl.$^4$ ...................... C09D 11/02; C09B 29/00
[52] U.S. Cl. ........................................ 106/22; 106/20; 534/583; 534/741; 8/682
[58] Field of Search .................... 106/20, 22; 534/583, 534/741; 8/682

[56] References Cited

U.S. PATENT DOCUMENTS

| 2,657,202 | 10/1953 | Moser | 534/741 |
| 3,274,171 | 9/1966 | Anderson et al. | 534/741 |
| 4,001,206 | 1/1977 | Schoefberger | 534/741 |
| 4,071,312 | 1/1978 | Blackwell | 534/583 |
| 4,254,026 | 3/1981 | Bauer et al. | 534/582 |
| 4,399,068 | 8/1983 | Krämer | 534/741 |

FOREIGN PATENT DOCUMENTS

| 0863972 | 1/1953 | Fed. Rep. of Germany | 534/741 |
| 2821350 | 11/1979 | Fed. Rep. of Germany | 534/741 |

Primary Examiner—Paul Lieberman
Assistant Examiner—Helene Kirschner

Attorney, Agent, or Firm—Connolly and Hutz

[57] ABSTRACT

Water-soluble, yellow monoazo dyestuffs of the formula

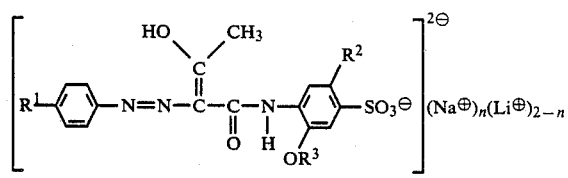

wherein
$R^1$ is a moiety of the formula

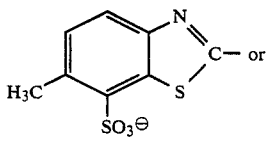

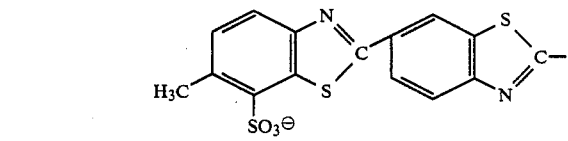

$R^2$ is methyl, ethyl, methoxy or ethoxy,
$R^3$ is methyl or ethyl, and
n is a number from 0.3 to 1.7,
are useful for the preparation of recording fluids.

10 Claims, No Drawings

WATER-SOLUBLE YELLOW MONOAZO DYESTUFFS

The invention relates to water-soluble yellow monoazo dyestuffs of the formula I

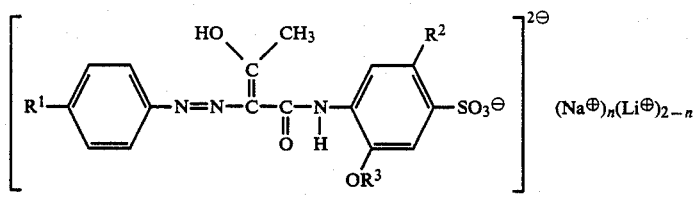

wherein
$R^1$ denotes the radical

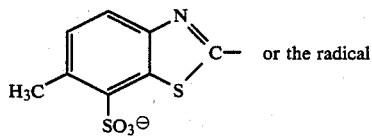  or the radical

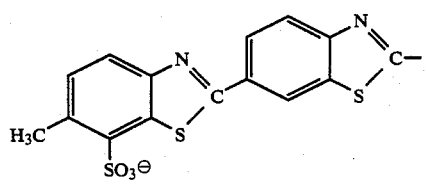

$R^2$ denotes methyl, ethyl, methoxy or ethoxy,
$R^3$ denotes methyl or ethyl and n denotes a number from 0.3 to 1.7.

The invention also relates to a process for the preparation of the dyestuffs of the formula I and to their use for the preparation of recording fluids, in particular for the ink jet printing process, and also to these recording fluids.

Recording fluids or writing fluids are also known as inks. They are used, for example, in ballpoint pens, fibre pens, fountain pens and mechanical recording pens or in the so-called ink jet printing process.

The ink jet printing process is described, for example, in: Ullmanns Encyklopadie der Technischen Chemie ("Ullmann's Encyclopedia of Industrial Chemistry"): 4th edition, volume 23, (1983), 262-264, and Kirk-Othmer, Encyclopedia of Chemical Technology, 3rd edition, volume 20, (1982) 153-156. It is a noncontacting printing process in which droplets of a writing fluid are sprayed from a jet or several jets onto the surface to be printed.

A recording fluid consists in principle of a soluble dyestuff which is dissolved in a solvent, in most cases water, or in a mixture of solvents. The solvent as a rule also contains further auxiliaries such as, for example, surface-active substances, humectants and/or preservatives.

Very high requirements in respect of purity and freedom from particles are set for recording fluids for the ink jet printing process. In particular, they must not cause any corrosion or change in viscosity, or even dry incipiently, at the orifice of the jet when the jet is out of action, nor must they become encrusted over a prolonged period. These and other demands require that the dyestuffs used for the preparation of recoding fluids must contain virtually no salts or standardizing agents.

The dyestuffs originally prepared for dyeing and printing textile materials usually contain, from their preparation, considerable amounts of salts, such as, for example, sodium sulphate, sodium acetate and particularly sodium chloride. In the case of textile dyestuffs, salts of this type are also often added after synthesis as extenders or standardizing agents.

Normal salt-containing dyestuffs are not suitable for the preparation of recording fluids for the ink jet printing process. The dyestuffs intended for the preparation of recording fluids for the ink jet process must, therefore, first be subjected to involved and expensive purifying operations such as are described, for example, in DE-A 3,539,727.

The present invention provides readily accessible dyestuffs of low salt content which, in the form of recording fluids, are also excellently suitable for the ink jet printing process. The process according to the invention for the preparation of the dyestuffs is advantageous from the economic and ecological points of view. It affords directly, that is to say without a subsequent purifying operation, dyestuffs which, in the form of recording fluids, can be employed in the ink jet printing process.

The dyestuffs, according to the invention, of the formula I are mixed sodium and lithium salts of dye acids containing two sulpho groups in the molecule. Accordingly, the total of the sodium and lithium ions present in the molecule is two, it being possible, depending on the meaning of n, for the number of sodium ions to be 0.3 to 1.7 and for the number of lithium ions to be 1.7 to 0.3.

Dyestuffs of the formula I which are preferred are those in which n denotes the number 1 and/or $R^1$ denotes the radical

and $R_2$ denotes methyl and $R_3$ denotes methyl.

The dyestuffs, according to the invention, of the formula I are prepared by the process according to the invention by diazotizing, in an aqueous medium, a diazo component of the general formula II

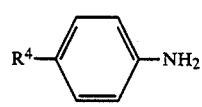

wherein $R^4$ denotes the radical

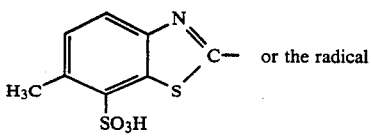 or the radical

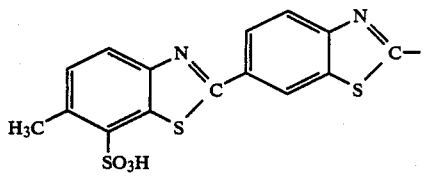

by the addition of MeNO$_2$ in which Me denotes Na or Li or a mixture of Na and Li, and coupling the product with a coupling component of the general formula III

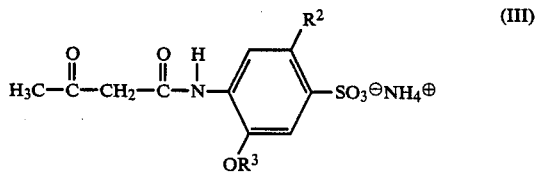 (III)

wherein R$^2$ and R$^3$ have the meanings already mentioned and subsequently adjusting the pH of the solution to a value of 7 to 10, preferably 7 to 9 and very particularly preferably 7.5 to 8.5, by means of Me$^1$OH and/or (Me$^2$)$_2$CO$_3$ in which Me$^1$ and Me$^2$ denote Na or Li or a mixture of Na and Li, and then removing by distillation the ammonia present in the solution.

The diazotization and coupling reactions are carried out in an aqueous medium, normally at temperatures from $-10°$ to $+50°$ C., preferably $0°$ to $20°$ C.

The reaction medium used is water or a mixture of water and one or more water-miscible organic solvent(s). A mixture of water and a monohydric, readily recoverable alcohol or several alcohols of this type is particularly preferred as the aqueous reaction medium. Methanol, ethanol and isopropanol are particularly suitable as readily recoverable alcohols, that is to say alcohols which can readily be distilled off. If the aqueous reaction medium contains a solvent in addition to water, this solvent is removed by distillation, if appropriate under reduced pressure, before or after the addition of the Me$^1$OH and/or (Me$^2$)$_2$CO$_3$.

It is particularly advantageous to carry out the diazotization and coupling in such a way that the coupling component of the formula III and the diazo component of the formula II are initially taken in a 1:1 molar ratio in the aqueous reaction medium, and an equivalent amount of MeNO$_2$ is added to this mixture. The pH is then adjusted to a range from 2.5 to 5. As is also the case subsequently with the Me$^1$OH and/or (Me$^2$)$_2$CO$_3$, the MeNO$_2$ is advantageously added here in the form of an aqueous solution.

After the MeNO$_2$ has been added it is advantageous to stir for a further ½ to several hours in order to complete the coupling reaction. In the course of this the temperature can also be allowed to rise somewhat.

The pH is then adjusted to a value of 7 to 10, preferably 7 to 9 and very particularly preferably 7.5 to 8.5, by adding Me$^1$OH and/or (Me$^2$)$_2$CO$_3$, advantaeously in the form of an aqueous solution.

Depending on the meanings indicated for Me, Me$^1$ and Me$^2$, the MeNO$_2$ can consist of sodium nitrite or lithium nitrite or of a mixture of these two nitrites, and the Me$^1$OH can consist of sodium hydroxide or lithium hydroxide or of a mixture of these two hydroxides, and the (Me$^2$)$_2$CO$_3$ can consist of sodium carbonate or lithium carbonate or of a mixture of these two carbonates. MeNO$_2$, Me$^1$OH and/or (Me$^2$)$_2$CO$_3$, that is to say the nitrites, hydroxides and/or carbonates of sodium and/or lithium, can, of course, also be employed here in the form of their hydrates, insofar as the latter are known.

The compositions of the MeNO$_2$, Me$^1$OH and/or (Me$^2$)$_2$CO$_3$ are so chosen that, after the addition of, the Me$^1$OH and/or (Me$^2$)$_2$CO$_3$, an Na$^\oplus$: Li$^\oplus$ ratio of n: (2$-$n) exists in the solution containing the dyestuff, n denoting a number from 0.3 to 1.7.

It is advantageous to use water of the lowest possible salt content, best distilled or desalinated water, for the preparation of the aqueous solutions of MeNO$_2$Me$^1$OH and (Me$^2$)$_2$CO$_3$ which are advantageously used, and similarly for the reaction medium.

After the addition of the Me$^1$OH and/or (Me$^2$)$_2$CO$^3$ to the dyestuff solution, ammonia and any organic solvent which may (still) be present are removed from the solution by distillation. The organic solvent can also be distilled off before the addition of the Me$^1$OH and/or (Me$^2$)$_2$CO$_3$. Normally, however, the organic solvent will be distilled off together with the ammonia, since it is thereby possible to dispense with a distillation process. The distillation can also be carried out under reduced pressure. It is terminated when the ammonia present in the dyestuff solution and any organic solvent which may be present has been removed. It is advantageous to recover the solvent which has been distilled off.

The removal by distillation of the organic solvent is not necessary in every case and it can, for example, be omitted completely or in part if the same organic solvent is to be used in the subsequent preparation of the recording fluid.

It is advantageos to subject to a clarification by filtration in the presence of active charcoal, silicone dioxide or the like the dyestuff solution which is present after the removal by disillation of the ammonia and any organic solvent which may be present. The dyestuff of the formula I can be obtained from the resulting solution in a solid form by drying, for example by spray drying. However, it is advantageous to use the dyestuff solution present after the removal by distillation of the ammonia, or after the clarification by filtration, for the preparation of recording fluids without further treatment.

In general, the finished recording fluids contain 0.5 to 15% by weight of dyestuff (calculated on a dry basis), 10 to 95% by weight of water and 0.5 to 70% by weight of solvent and/or humectant. In particular, the finished recording fluids contain 0.5 to 15% by weight of dyestuff (calculated on a dry basis), 40 to 85% by weight of water and 15 to 50% by weight of solvent and/or humectant. As a rule, the finished recording fluids also contain other additives, mentioned below.

The water used for the preparation of the recording fluids is peferably employed in the form of distilled or desalinated water. In addition to water, an organic, water-soluble solvent or a mixture of such solvents can also be present in the recording fluids. Examples of suitable solvents are monohydric and polyhydric alcohols and ethers and esters thereof, for example alkanols, in particular those having 1 to 4 C atoms, such as, for example, methanol, ethanol, propanol, isopropanol, butanol, isobutanol and tert.-butanol; dihydric and trihydric alcohols, in particular those having 2 to 6 C atoms, for example ethylene glycol, propylene glycol, 1,3-propanediol, 1,4-butanediol, 1,5-pentanediol, 1,6-hexanediol, 1,2,6-hexanetriol, glycerol, diethylene glycol and dipropylene glycol; polyalkylene glycols, such as, for example, triethylene glycol, polyethylene glycol, tripropylene glycol and polypropylene glycol; lower alkyl ethers of polyhydric alcohols, such as, for example, ethylene glycol monomethyl or monoethyl or monopropyl or monobutyl ether, diethylene glycol monomethyl or monoethyl ether, or triethylene glycol monomethyl or monoethyl ether; ketones and ketoalcohols, in particular those having 3 to 7 C atoms, such as, for example, acetone, methyl ethyl ketone, diethyl ketone, methyl isobutyl ketone, methyl pentyl ketone, cyclopentanone, cyclohexanone and diacetone alcohol; ethers, such as, for example, dibutyl ether, tetrahydrofuran and dioxane; esters, such as, for example, ethylformate, methylformate, methylacetate, ethylacetate, propyleneacetate, butylacetate, phenylacetate, ethylglycol monoethyl ethereacetate and 2-hydroxyethyl acetate; amides, such as, for example, dimethylformamide, dimethylacetamide and N-methylpyrolidone; and also urea, tetramethylurea and thiodiglycol.

Some of the the substances mentioned above not only act as solvents, but also display other properties. Thus, for example, the polyhydric alcohols also act as humectants.

The following can also be added to the recording agents: preservatives, such as, for example, phenol, cationic, anionic or nonionic surface-active substances (wetting agents) and agents for regulating the viscosity, for example polyvinyl alcohol, cellulose derivatives or water-soluble, natural or synthetic resins as film-formers or binders for increasing the adhesion and resistance to abrasion.

Amines, such as, for example, ethanolamine, diethanolamine, triethanolamine, N,N-dimethylethanolamine or diisopropylamine, are used mainly to increase the pH of the recording fluid. As a rule, they are present in the recording fluid to the extent of 0 to 10% by weight, preferably 0.5 to 5% by weight.

Information on the compositions of inks, in particular also inks for the jet printing process, are to be found, for example, in DE-A 2,132,324, DE-A 2,160,475 and U.S. Pat. Nos. 4,024,096, 4,024,397 and 4,070,322. The exact composition of the recording fluid will, of course, be adjusted to suit the intended end use.

In the case of recording fluids for the ink jet printing process it is also possible, depending on the embodiment of this printing process, for example as a continuous jet, intermittent jet, impulse jet or compound jet process, to add, if required, further additives, for example in order to buffer the pH and to adjust the electrical conductivity, the specific heat, the coefficient of thermal expansion and the thermal conductivity.

The recording fluids can be prepared in a simple manner by mixing the components which can, for example, be carried out by dissolving a dyestuff of the formula I in water or, if necessary, diluting further with water an aqueous solution obtained in the preparation of the dyestuff of the formula I, and then admixing the other additional components, such as solvents etc.

The recording fluids containing one or more dyestuffs of the formula I are extremely suitable for use in printing, duplicating, marking, writing, drawing, stamping or recording processes, but also, in particular, in the ink jet printing process. In this regard, yellow prints of high quality which have an excellent colour reproduction, high brilliance and sharpness and good resistance to water, light and abrasion are obtained. The recording fluids are also excellently suitable for multi-color printing. When inks according to the invention are stored, there is only a minimal deposition of precipitates, or none at all. In ink jet printing, inks according to the invention are distinguished by a low tendency for the jets to block. Nor do any changes in the physical properties of inks according to the invention take place if the latter are used in an ink jet printer for a prolonged period with continuous recirculation or intermittently with the ink jet printer switched off in the meanwhile.

In comparison with the dyestuffs described in German Pat. Specification 2,821,350, the mixed sodium/lithium salts, according to the invention, of the formula I exhibit an improved stability of pH and solubility; the recording fluids prepared from the dyestuffs according to the invention are also distinguished by a higher surface tension and an improved stability on storage.

EXAMPLE 1

A mixture of 320 g of 2-(4'-aminophenyl)-6-methylbenzothiazole-7-sulphonic acid and 318 g of ammonium 1-acetoacetylamino-2-methoxy-5-methylbenzene-4-sulphonate are introduced into a mixture of 2 l of desalinated water and 2 l of 96% strength ethanol, and the mixture is cooled to 15° C. and a solution of 69.2 g of sodium nitrite in 300 ml of desalinated water is added.

The mixture is stirred for 4 hours at a temperature of 30° to 40° C., the pH is adjusted to 8 with a solution of 53.0 g of lithium hydroxide monohydrate in 320 ml of desalinated water, and aqueous ethanol is removed by distillaton until a boiling point of 100° C. is reached. This gives 2720 g of a yellow dyestuff solution from which 713.2 g of a yellow dyestuff of low salt content of the formula

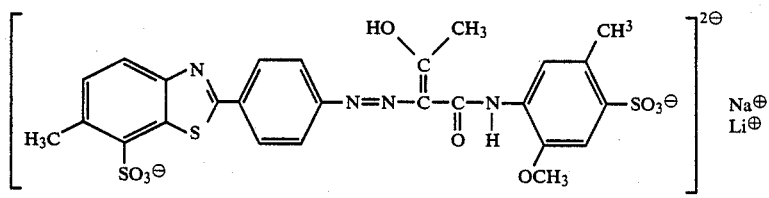

are obtained by evaporation at 80° C. in a circulating air drying cabinet. This dyestuff corresponds to a dyestuff of formula I wherein n is 1. λmax is 395 μm.

EXAMPLE 2

If the procedure indicated in example 1 is followed, but employing 454 g of 2-(4'-aminophenyl)-6-(6''-methylbenzothiazol-2''-yl)-benzothiazol-7''-sulphonic acid (primuline acid) instead of 320 g of 2-(4'-aminophenyl)-6-methylbenzothiazole-7-sulphonic acid (pH after the addition of lithium hydroxide monohydrate: 8.5–9), 771 g of a dyestuff of low salt content of the formula I in which $R^1=$

[structure: benzothiazole-benzothiazole with H₃C and SO₃⁻ substituents]

$R^2$=methyl, $R^3$=methyl and n=1 are obtained after drying. λmax: 410 μm.

EXAMPLE 3

If the procedure indicated in example 1 is followed, but employing a solution of 71 g of lithium nitrite monohydrate instead of 69.2 g of sodium nitrite and a mixture of 12 g of sodium hydroxide and 29.3 g of lithium hydroxide monohydrate instead of 53.6 g of lithium hydroxide monohydrate, whereby the pH is adjusted to a value of 8 to 8.5, the monoazo dyestuff of example 1 is obtained, but n is 0.3, that is to say it contains 1.7 Li⊕ and 0.3 Na⊕.

EXAMPLE 4

If the procedure indicated in example 1 is followed, but employing a mixture of 12.6 g of lithium hydroxide monohydrate and 32 g of sodium hydroxide instead of 53.6 g of lithium hydroxide monohydrate in the neutralization, whereby the pH is adjusted to a value of 8 to 8.5, the monoazo dyestuff of example 1 is obtained, but n is 1.7, that is to say it contains 0.3 Li⊕ and 1.7 Na⊕.

The structure of other monoazo dyestuffs which can be prepared in accordance with the data of example 1 can be seen from the following table:

| Example | Dyestuff of the formula I | | | | |
|---|---|---|---|---|---|
| | $R^1$ | $R^2$ | $R^3$ | n | λmax (μm) |
| 5 | [benzothiazole with H₃C and SO₃⁻] | —CH₃ | —C₂H₅ | 1 | 396 |
| 6 | [benzothiazole with H₃C and SO₃⁻] | —OCH₃ | —CH₃ | 1 | 416 |

EXAMPLE 7

In order to test the fastness to light, fastness to water and heat stability of the recording fluids according to the invention in comparison with recording fluids containing known yellow dyestuffs, various inks of the following formulation are prepared:
4% by weight of dyestuff,
4% by weight of triethanolamine,
77% by weight of water (distilled) and
15% by weight of diethylene glycol,
and are tested as follows:

1. Determination of fastness to water 50 ml of the 4% strength ink are poured into a porcelain evaporating dish. A strip of filter paper (Schleicher and Schüll No. 2290) is drawn through the solution in the course of 5 seconds. The paper dip-dyeing thus obtained is dried for 24 hours. The depth of colour of this paper dip-dyeing is designated $F_0$ and is determined using a Spectrogard spectral photometer made by Scientific. The fastness to water is determined by immersing the paper dip-dyeing obtained above, in water, for 15 seconds, drying it and thereby determining the depth of colour $F_{15}$.

The loss of dyestuff is calculated from the formula:

$$F_0 - F_{15}/F_0 \times 100 \, (\%)$$

Good fastness to water gives a loss of $-10$ to $-20\%$ in depth of colour.

2. Determination of heat stability

Part of the 4% strength ink is stored in a closed vessel for 4 days at 90° C. The difference in colour shade between the two solutions in the L* a* b* colour space as defined in DIN 6174 is then measured. The difference in colour shade is quoted in Δ E units. As a rule, a Δ E value of 1 will not be perceived as a difference in colour shade by an untrained observer.

The results obtained in the tests mentioned above are collated in the following table:

TABLE

| Dyestuff | Fastness to water, % | Heat stability Δ E |
|---|---|---|
| According to example 1 | −21 | 0.8 |
| Acid Yellow 245 | −65 | 0.35 |
| Acid Yellow 23 | −58 | 0.9 |
| Reactive Yellow 37 | −51 | 0.5 |
| Direct Yellow 44 | −28 | 7.76 |

The values given in the table show that, compared with the other acid, reactive and direct dyestuffs, the dyestuff, according to the invention, of the formula I has a good to very good improvement in fastness to water and a good heat stability.

The ink prepared in accordance with the formulation indicated, using the dyestuff according to example 1, has a ph of 8.5 and is suitable, in particular as a recording fluid for the ink jet printing process.

What is claimed is:

1. Water soluble yellow monoazo dyestuffs of the formula $$\left[ R^1-\langle\phantom{X}\rangle-N=N-C(-C(OH)(CH_3))-C(=O)-N(H)-\langle\phantom{X}\rangle(R^2)(OR^3)-SO_3^\ominus \right]^{2\ominus} (Na^\oplus)_n (Li^\oplus)_{2-n}$$

wherein
$R^1$ is a moiety of the formula

[benzothiazole structure with H₃C and SO₃⁻] —C— or

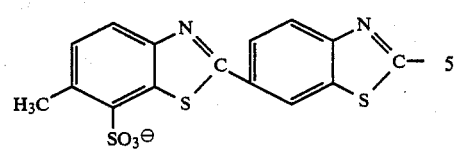

$R^2$ is methyl, ethyl, methoxy or ethoxy, $R^3$ is methyl or ethyl and n is a number from 0.3 to 1.7.

2. Monoazo dyestuffs according to claim 1 wherein $R^1$ is

$R^2$ is methyl and $R^3$ is methyl.

3. Monoazodyestuffs according to claim 1 wherein n is about 1.

4. Process for the preparation of the water soluble yellow monoazo dyestuff according to claim 1 which comprises diazotizing an amine of the formula

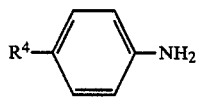

wherein $R^4$ is a moiety of the formula

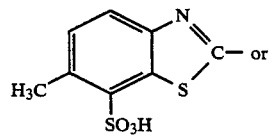

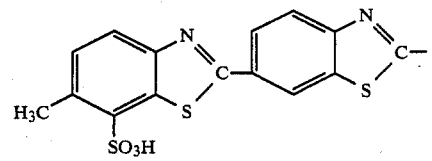

in an aqueous medium by the addition of $MeNO_2$ in which Me is Na, Li or a mixture of Na and Li, and coupling the diazotized amine with a coupling component of the formula

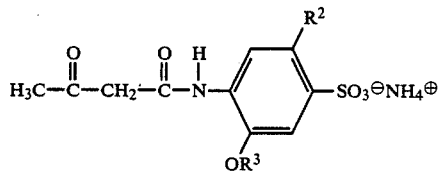

wherein $R^2$ is methyl, ethyl, methoxy or ethoxy and $R^3$ is methyl or ethyl, adjusting the pH of the solution to a value of 7 to 10 by addition of $Me^1OH$ or $(Me^2)_2CO_3$, in which $Me^1$ and $Me^2$ are Na, Li or a mixture of Na and Li, the compositions of $MeNO_2$, $Me^1OH$ and $(Me^2)_2CO_3$ being such that, after the addition of the $Me^1OH$, $(Me^2)_2CO_3$, or both, the $Na^{61}$ : $Li^\oplus$ ratio is n:(2−n), n being a number of 0.3 to 1.7, exists in the solution containing the dyestuff, and any ammonia present in the solution is then removed by distillation.

5. Process according to claim 4 wherein the aqueous reaction medium is water mixed with a recoverble alcohol and the alcohol is removed by distillation from the reaction medium before or after the addition of the $Me^1OH$ or $(Me^2)_2CO_3$.

6. Process according to claim 5 wherein the recoverable alcohol is methanol, ethanol or isopropyl alcohol.

7. Process according to claim 4 wherein the pH of the solution is adjusted to a value of 7 to 9 after coupling.

8. Process according to claim 4 wherein the pH of the solution is adjusted to value of 7.5 to 8.5 after coupling.

9. Recording fluid containing 0.5 to 15% by weight of a dyestuff according to claim 1, 10 to 95% by weight of water and 0.5 to 70% by weight of solvent or humectant or a mixture of solvent and humectant.

10. Recording fluid according to claim 9 containing 0.5 to 15% by weight of dyestuff, 40 to 85% by weight of water and 15 to 50% by weight of solvent or humectant or a mixture of solvent and humectant.

* * * * *